United States Patent [19]

McElroy

[11] 4,227,067
[45] Oct. 7, 1980

[54] HEATER ADAPTER FOR MAKING POLYETHYLENE PIPE CONNECTIONS

[76] Inventor: Arthur H. McElroy, P.O. Box 15580, Tulsa, Okla. 74115

[21] Appl. No.: 893,675

[22] Filed: Apr. 5, 1978

Related U.S. Application Data

[63] Continuation-in-part of Ser. No. 650,189, Jan. 19, 1976, abandoned.

[51] Int. Cl.² .......................... H05B 1/00; B32B 31/20
[52] U.S. Cl. .................................... 219/243; 156/322; 156/499; 156/579; 156/581; 156/583.1; 219/228
[58] Field of Search ............... 219/228, 243, 245, 227, 219/221; 285/21, DIG. 20; 156/293, 304, 306, 320, 322, 502, 499, 535, 581, 583.1, 583.2, 583.4, 579

[56] References Cited

U.S. PATENT DOCUMENTS

| 7,952 | 2/1851 | Clapp | 38/93 |
|---|---|---|---|
| 2,262,480 | 11/1941 | Waters | 219/243 X |
| 2,449,111 | 9/1948 | Foster | 38/93 X |
| 2,653,394 | 9/1953 | Nelson et al. | 219/243 X |
| 2,768,272 | 10/1956 | Lesher | 219/245 |
| 3,119,922 | 1/1964 | Mayhew | 156/581 X |
| 3,243,334 | 3/1966 | Lake | 156/583.4 |
| 3,258,385 | 6/1966 | Lake | 156/581 |
| 3,258,386 | 6/1966 | Blythe | 156/583.4 |
| 3,846,208 | 11/1974 | McElroy | 156/293 X |
| 3,966,258 | 6/1976 | Christie | 156/499 X |

FOREIGN PATENT DOCUMENTS

658647  4/1938  Fed. Rep. of Germany .............. 38/93

Primary Examiner—A. Bartis
Attorney, Agent, or Firm—Head, Johnson & Chafin

[57] ABSTRACT

A platen assembly for simultaneously contact heating surface portions of two polyethylene thick-walled pipes that are to be joined together in a heat bonding process is provided with opposed platen surfaces configured to match the respective pipe surface portions to be heated. The platen assembly is adapted to be placed between the pipe surface portions and an electric heating element in the platen assembly heats the platen surfaces to a temperature sufficient to heat melt the pipe surface portions contacted thereby. The platen surfaces adapted to contact the pipe surface portions are formed with ridges and grooves over their full extent to increase the surface thermal contact between the platen surfaces and the pipe portion surfaces. The ridges and grooves on one platen surface are aligned, respectively, with the ridges and grooves on the other surface to form aligned ridges and grooves in the heat melted pipe surface portions. After the platen assembly is removed, the pipe surface portions are brought together into ridge-to-ridge contact, which leaves openings defined by the respective grooves. As the parts are pressed together the ridges widen as heat melted material flows into the grooves, thereby maintaining an escape passage for air trapped between the pipe surfaces portions being bonded together until completion of the bonding process.

16 Claims, 7 Drawing Figures

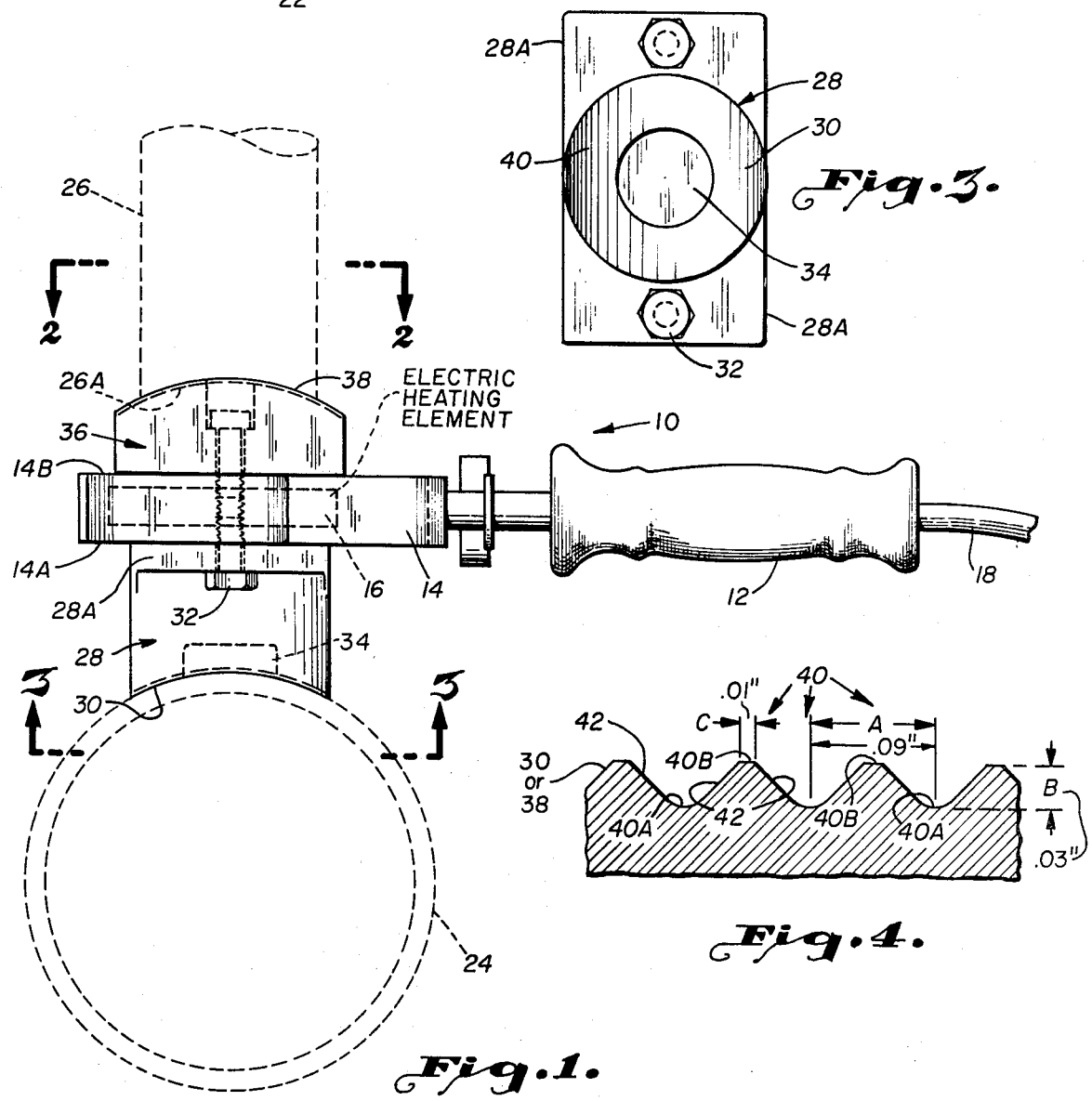

HEATER ADAPTER FOR MAKING POLYETHYLENE PIPE CONNECTIONS

CROSS-REFERENCE TO RELATED APPLICATION

This application is a continuation-in-part of the copending application of the same applicant, Ser. No. 650,189, filed Jan. 19, 1976, entitled: HEATER ADAPTER FOR MAKING POLYETHYLENE PIPE CONNECTIONS, now abandoned.

BACKGROUND AND OBJECTS OF THE INVENTION

In the gas and water distribution sewage and waste water industry, as well as the handling of sewage and waste waters, it is frequently necessary to join plastic pipes together and join fittings to the pipe. When thermoplastic pipe, such as polyethylene pipe, is utilized a common economical and highly effective means is to heat fuse the pipes and fittings. This is accomplished by heating the surfaces to be joined so that each reaches a molten state. While the portions of the two elements to be joined remain in a molten state, they are forced together. The molten portions intermix and adhere and, upon solidification, which occurs rapidly, the pipes or fittings are then fused together. This arrangement does not require the use of coupling devices, either threaded or otherwise, nor the use of adhesive or other chemical bonding agents.

In order to achieve a completely effective heat fusion of one thermoplastic element to another it is important that the areas to be fused together are heated to a sufficient depth so that when they are forced together a true bond occurs. The depth of bonding should be such that the welded joint has strength equal to or greater than the elements themselves.

Reference may be had to U.S. Pat. No. 3,846,208 entitled "COMBINATION PIPE FUSION UNIT", wherein apparatus and processes are described for the heat fusion of one plastic pipe to another. The apparatus and process described in the above mentioned patent includes the use of a platen having electrical heating elements and a thermostat by which the temperature of the platen may be selected. A thermometer is frequently employed for indicating to the operator when the desired temperature of the platen has been reached. If plastic pipe is to be joined end to end, that is, butt welded or butt fused, a platen which is flat on both parallel surfaces is employed. However, when a first pipe is to be joined to a second at the sidewall of the second pipe then a platen with curved surfaces must be employed, one portion being convex and the other concave to heat the portions of the pipes to be joined so that they will accurately mesh together and fuse to provide a permanent joint. The same type of platen is employed to weld a fitting to the wall of a pipe.

While platens in present use have performed satisfactorily, one problem which exists is that of heating the areas of the pipes to be fused to a sufficient depth so that the fused joint has the ultimately desired strength. Another problem with existing platens is that the flat platen surfaces provide areas wherein air may be entrapped. Entrapped air serves not only to insulate a part of the pipe so that it does not properly melt to a fusion state, but if the trapped air remains as the heated portions are forced together a void can result in the fused joint.

These and other problems exist with present platen designs and are overcome in this invention to be described.

It is, therefore, an object of this invention to provide an improved platen for use in heating portions of plastic pipe or fittings to be joined by heat fusion.

Another object of this invention is to provide an improved platen for heating portions of plastic pipe fittings to be fused together, the platen having parallel equally spaced grooves therein to increase the contact area with the portions to be fused and to thereby obtain a greater depth of melt and other advantages resulting in an improved fused joint.

These general objects as well as other and more specific objects of the invention will be fulfilled in the following description and claims, taken in conjunction with the attached drawings.

SUMMARY OF THE INVENTION

The invention provides a platen for heating portions of thermoplastic elements to be joined by heat fusion, and particularly the end of a smaller diameter plastic pipe to the sidewall of a larger diameter plastic pipe, the platen including a first portion configured to engage one pipe and a second portion configured to engage the other pipe, each portion of the platen having grooves therein to thereby increase the area of contact between the platen and the plastic pipes to be joined, the grooves promoting increased depth of melt of the portions to be joined, providing improved mixing of the surfaces when the melted portions are pressed together, providing channels for the escape of air and achieving reduced sticking of the heated portions of the plastic elements to the platen.

The ridges and grooves in the surfaces of the platen form corresponding grooves and ridges in the heat softened surfaces of the pipes, with the groove portions of the platen forming ridges in the hot plastic, and vice versa.

The ridges and grooves on the two hot surfaces of the platen are aligned so that the ridges on one surface are opposite the ridges on the other surface, etc. Then, when the platen is removed and the two heat softened surfaces are moved together, the ridges of plastic on the two surfaces will be aligned. These ridges will contact first, leaving openings corresponding to the two grooves. As the two parts are pressed together the ridges widen, under pressure, the material flows sideways into the grooves, maintaining a passage so that all air will flow out of the joint, without leaving entrapped bubbles of air.

BRIEF DESCRIPTION OF VIEWS

FIG. 1 is an elevational side view showing a platen being used to heat the end of a smaller diameter branch pipe and to heat a portion of the sidewall of a larger diameter main pipe in preparation of the fuse welding of the pipes together.

FIG. 2 is a view taken along the line 2—2 of FIG. 1 showing only the platen as employed in the heat fusion of the two pipes, the upper surface of the platen being convex to provide a heated end surface of the branch pipe to match the sidewall of the larger diameter main pipe to which it is to be joined.

FIG. 3 is a view taken along the line 3—3 of FIG. 1 but showing only the concave portion of the platen as employed to heat a portion of the sidewall of the larger diameter main pipe to receive the smaller diameter pipe for the heat fusion of the two together.

FIG. 4 is an enlarged view of a portion of the concave and convex surfaces of the respective platen portions showing details of the grooves formed in the heating surface thereof.

DETAILED DESCRIPTION

Figure 5:
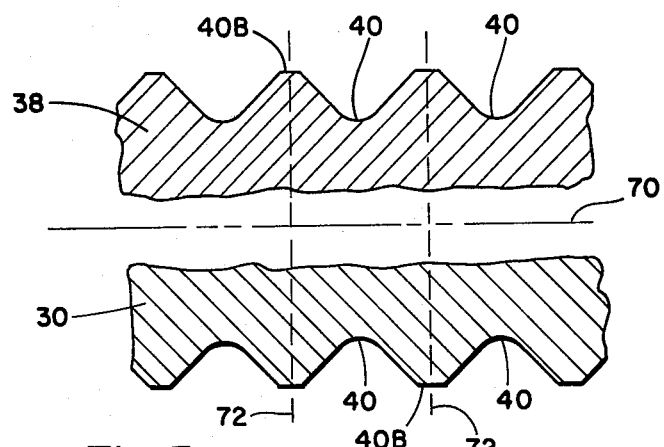
FIG. 5 represents a cross-section through the two heating surfaces of the platen showing alignment of ridges against ridges.

Referring to the drawings, and first to FIG. 1, an embodiment illustrating the principles of this invention is shown. The invention concerns improvements in a heated platen generally indicated by the numeral 10. The platen to be described and particularly the improved contacting surface of the platen may be employed to fuse weld thermoplastic elements of many shapes and configurations to each other. Particularly, the platen with the improved surface may be employed to weld fittings to pipe. However, the invention will be described by way of example only, as it is applied to welding the end of a smaller diameter branch pipe to the sidewall of a larger diameter main pipe.

While the size and shape of the platen may vary considerably, a hand held platen is illustrated. The platen includes a handle portion 12 and a base portion 14. The base portion includes heating means such as internally positioned resistance heaters 16 and a thermostat (not shown) for controlling the temperature of the platen. Electrical energy is supplied by way of conductor 18 to the heaters and the platen usually includes, as shown in FIG. 2, a temperature indicator 20. The base portion may also be heated by other means, such as gas flame. The use of electric heating means is shown by way of example.

The invention described to this point is, more or less, of standard design in use today. As shown in FIG. 2 the platen may include flanges 22 to hold it in position in a holding device whereby pipes are joined together.

FIG. 1 shows the platen in position for heating the end of a first or smaller diameter branch pipe 26 and a portion of the sidewall of a larger diameter main pipe 24.

Affixed to the lower surface 14A of the platen base portion 14 is a first pipe heating platen portion 28 having a concave heating surface 30. The first pipe heating platen portion 28 may be formed integrally with platen base portion 14 or it may, as shown, be attached to lower surface 14A using bolts 32. The first pipe heating platen portion 28 may include integral flanges 28A which receive bolts 32 to hold the heating platen portion 28 to the platen portion.

The concave heating surface 30 has a radius of curvature substantially equal to pipe 24. Internally of the heating surface 30 is a recess 34 which does not contact pipe 24 so that the heat of the platen applied by way of concave heating surface 30 may be concentrated in the cylindrical area to be contacted by the end of pipe 26.

Affixed to platen base portion 14 upper surface 14B is a second pipe heating platen portion 36, having a convex heating surface 38. The convex surface 38 is preferably of a radius of curvature equal to the exterior of pipe 23 and is configured to fit the preformed end 26A of branch pipe 26 so that when heated the end 26A of the branch pipe will mate with the external surface of main pipe 24.

An important feature of this invention is the provision of grooves 40 in both the concave heating surface 30 and the convex heating surface 38. FIG. 4 shows an enlarged cross-sectional portion of the heating surface 30 or 38. The grooves preferably are defined by sidewalls 42 which are in planes that intersect each other at an angle of 60°. The spacing A between the valleys of the grooves is preferably about 0.09 inches and the depth B of the grooves 40 is preferably about 0.03 inches. The valleys 40A of the grooves are rounded by a radius of curvature of about 0.02 inches. The peaks between adjacent grooves are preferably flattened as illustrated, the flat area 40B having a width C of about 0.01 inches.

The above dimensions of grooves 40 are those preferred in joining together thermal plastic pipe and particularly polyethylene pipe, and are shown by way of illustration and not for limitation.

It is well known in the art that thermoplastic pipes, which are to be joined by heat fusion, are generally thick-walled pipes. For example, a 12 inch diameter pipe has a wall that is thicker than ⅜ inches. Smaller diameter pipes are thinner, being of the order of ¼ inch wall thickness. Thus, the spacing of the grooves may be of the order of ⅛ to ¼ of the wall thickness.

To join two thermoplastic portions together such as branch pipe 26 to main pipe 24, the platen as illustrated in FIG. 1 is heated and placed between the pipes to be joined and the pipes are simultaneously forced into contact with surfaces 30 and 38 of the platen. The pipes are maintained in contact with the platen until the surfaces are thoroughly heated to the molten state. The pipes are then pulled apart, the platen removed and the pipes immediately forced into contact with each other so that the mating surfaces are joined while they are both still in the molten state. The molten mating surfaces commingle and fuse into a unified element. As will be fully explained in connection with FIG. 6, the ridges of the heat-softened plastic on the two surfaces contact each other.

The provisions of grooves 40 in the platen heating surfaces 30 and 38 have several advantages including the following:

A. The surface area of the pipe contacted by the platen surfaces 30 and 38 is materially increased. When grooves 40 are configured such that the sidewalls are in planes intersecting at 60°, the total contact area with the grooves is twice that of a planar surface.

B. Grooves 40 reduce the effort required to melt a true matching curved surface between the preformed surface 26A of the branch pipe and the sidewall of main pipe 24. It can be seen that matching these curves perfectly is difficult especially when the external walls of plastic pipe are seldom perfectly circular. By the provision of the grooves in the platen surfaces 30 and 38, the surfaces of the elements to be joined are heated to a sufficient depth so that imperfection in the fit of the elements to be joined is compensated for, resulting in an improved joint.

C. The peaks between the valleys of the grooves penetrate into the surface of the elements being heated so that the depth of penetration of the melt is increased.

D. Grooved melted surfaces of elements to be joined promote greater mixing of the two surfaces when they are pressed together to achieve, after the joint has solidified, a more homogeneous fused area and thereby a better and stronger weld.

E. Grooves 40 in the platen surfaces 30 and 38, when pressed together, provide avenues for escape of entrapped air. This benefit is achieved in two instances. First, it helps eliminate the entrapment of air between the surfaces of the plastic elements to be heated and the heating surfaces of the platen. Second, after the surfaces of the plastic elements are heated and pressed together with ridges against ridges, the grooves afford increased opportunity for escape of air as the two molten surfaces are pressed against each other. By increasing the opportunity for entrapped air to escape the possibility of a defective or weakened joint is decreased.

F. Grooves 40 provide a sliding effect as the platen is removed from contact with the heated portions of the plastic elements to thereby reduce sticking.

G. The increased surface contact afforded by the provision of grooves 40 reduces the melt time required to achieve a melt of the areas to be fused since the rate of heat transfer between the platen surfaces 30 and 38 and the plastic elements is directly proportional to the area of contact.

H. The heated areas of plastic elements to be joined, when heated by a platen with heating surfaces having grooves 40 therein, can be mated, ridges to ridges, and forced together into proper fusion relationship with reduced pressure.

The invention described fulfills the objectives initially set forth, and provides an improved platen for fusion welding of plastic elements.

Referring now to FIG. 5, there is shown a duplicate of FIG. 4, part 30 and the corresponding part of the opposite heated surface 38. The dashed line 70 represents the central plane of the platen, which is parallel to lines through the peaks 40B of 30 and 38. This figure serves to make clear that the peaks of 30 are aligned with the peaks of 38, as shown by the lines 72, which are perpendicular to 70. This condition is described by saying that the ridges are in alignment and the grooves are in alignment.

Figure 6:
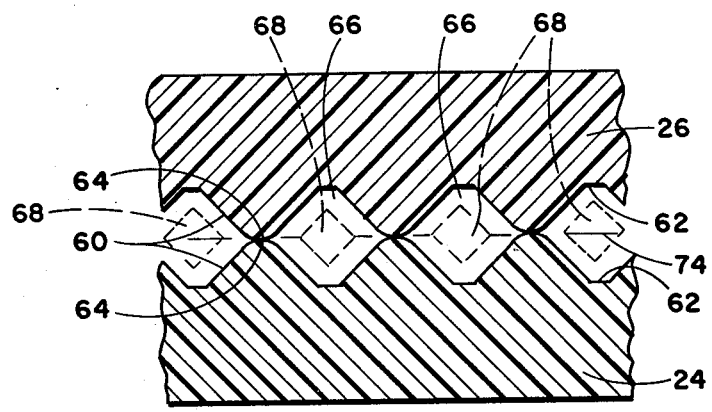
FIG. 6 is a section taken along the plane 6—6 of FIG. 7, showing the cross-section of the heated portions of the two pipes.
Figure 7:
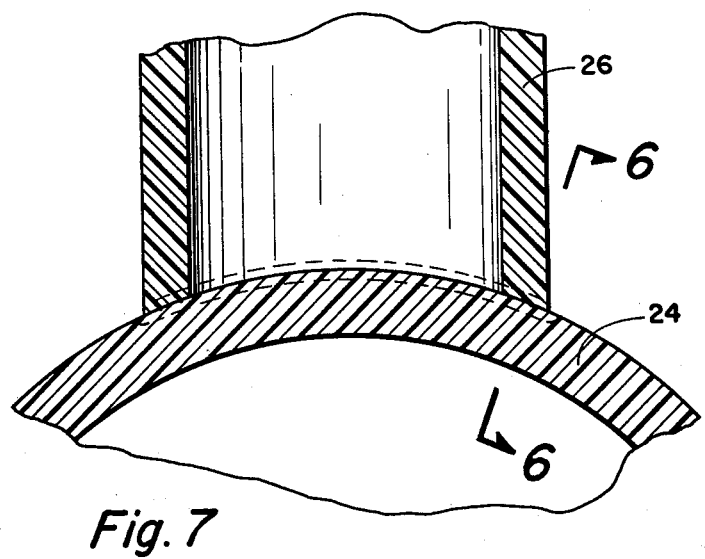
FIG. 7 represents a portion of FIG. 1, comprising the heat melted portions of the two pipes in contact.

FIG. 6 represents a cross-section through the plastic pipes 24, 26, taken along the plane 6—6 of FIG. 7, and indicates the contour of the heat-softened parts of the pipes as they are brought together for attachment.

The peaks and grooves on the heated surfaces are, of course, out of phase with the peaks and grooves on the platen. In other words, a peak on the platen forms a groove on the pipe surface. But, since the peaks are aligned with peaks on the platen, therefore, peaks are aligned with peaks on the heated plastic.

As shown in FIG. 6, at the moment of contact of 24 and 26, the peaks 64 touch, forming approximately openings 66 in between the peaks. Now, as pressure is applied between 24 and 26, the peaks 64 flatten and broaden as shown by the dashed lines 18 to form smaller openings 68. Then, at the maximum pressure the rectangles reduce to the point where all the air entrained is vented and the walls 60 come together, FIG. 7 illustrates the position of the two pipes 24, 26 after they have been heated and pressed together as shown in FIG. 6.

While I have described the ridges and grooves of the heating surfaces of the platen in relation to curved surfaces on the mating faces of the plastic pipes, this same feature of aligned ridges and aligned grooves on the heating surfaces can also be applied where the mating surfaces of the pipes are plane, such as when joining two pipe segments end to end.

While this invention has been described with a certain degree of particularity it is manifest that many changes may be made in the details of construction and the arrangement of components without departing from the spirit and scope of this disclosure. For instance, the grooves in the heating surfaces are illustrated as being parallel. It is not necessary that the grooves be parallel to each other. The grooves could be at angles relative to each other, or could be in the form of concentric circles or have other configurations. It is understood that the invention is not to be limited to the specific embodiments set forth herein by way of exemplifying the invention, but the invention is to be limited only by the scope of the attached claim or claims, including the full range of equivalency to which each element or step thereof is entitled.

What is claimed is:

1. A platen for simultaneously heating a first portion of a first thermoplastic thick-walled element and a first portion of a second thick-walled thermoplastic element in a process for heat fusion bonding together said two heated portions of said elements, and in which the depth of the heat metled first portions of said elements is greater than is possible with conventional heating devices, comprising;
   (a) a platen base having heating means for heating the base;
   (b) said platen having first and second opposed heating surfaces, said first surface configured to approximately match said first portion of said first element, said second surface configured to approximately match said first portion of said second element, said heating surfaces being heated by said heating means to a selected temperature sufficient to heat melt said first portions of said themoplastic elements;
   (c) ridge and groove means to provide over the full extent of said first and second heating surfaces increased surface thermal contact area between said heating surfaces and the corresponding portions of said elements; and wherein
   (d) the ridges on said first heating surface being in alignment with the ridges on said second heating surface, and the corresponding grooves on said first heating surface being in alignment with the grooves on said second heating surface.

2. A platen according to claim 1 wherein one of said heating surfaces is concave and including said ridges and grooves in said concave surface.

3. A platen according to claim 1 wherein one of said heating surfaces is convex and including said ridges and grooves in said convex surface.

4. A platen according to claim 1 wherein both of the heating surfaces are plane and parallel, and including ridges and grooves in both said surfaces.

5. The platen according to claim 4 in which the spacing between grooves is of the order of from ⅛ to ¼ of the wall thickness of said thick-walled thermoplastic elements.

6. A platen according to claim 1 wherein one of said heating surfaces is convex and the other heating surface is concave and including said ridges and grooves in said convex and concave surfaces, the spacing of the ridges being of the order of from ⅛ to ¼ of the wall thickness of said thick-walled thermoplastic elements.

7. A platen according to claim 1 wherein said grooves in cross-section have walls whose planes intersect at about 60°, the grooves being rounded valleys and having flattened peaks between adjacent valleys.

8. A platen according to claim 7 wherein said rounded valleys have a radius of about 0.02 inches.

9. A platen according to claim 7 wherein said peaks between adjacent grooves have a flattened width of about 0.01 inches.

10. A platen according to claim 1 wherein said grooves are equally spaced about 0.09 inches ridge to ridge and have a depth of about 0.03 inches.

11. A platen for simultaneously heating the end of a first length of thick-walled thermoplastic pipe and a portion of the exterior wall of an at least equal diameter second thick-walled thermoplastic pipe in a process for fusion bonding the end of the first pipe perpendicularly to the exterior wall of the second pipe, comprising:
  (a) a platen having a base portion, the base portion having a first side and a parallel opposed second side, and means of moving the platen into and out of engagement with the pipes to be joined;
  (b) means of heating said platen base portion;
  (c) a first pipe heating portion affixed to said platen base portion's first side, and heated by said heating means, the first pipe heating portion having a convex pipe engaging surface, the radius of curvature of said convex surface being substantially equal to the radius of the exterior of said second pipe, the entire convex pipe engaging surface having ridges and grooves therein;
  (d) a second pipe heating portion affixed to said platen base portion's second side and heated by said heating means, the second pipe heating portion having a concave pipe engaging surface, the radius of curvature of said concave surface being substantially equal to the radius of the exterior of said second pipe, the entire concave pipe engaging surface having ridges and grooves therein; and wherein
  (e) the ridges and grooves on said first pipe engaging surface being in alignment, respectively, with the ridges and grooves on the second pipe engaging surface.

12. A platen according to claim 11 wherein said grooves are in planes perpendicular the axis of the radius of curvature of the respective convex and concave surfaces.

13. A platen according to claim 12 wherein said peaks between adjacent valleys have a flattened width of about 0.01 inches.

14. A platen according to claim 11 wherein the grooves in said convex and concave surfaces have a spacing of about 0.09 inches and a depth of about 0.03 inches.

15. A platen according to claim 11 wherein said grooves, in cross-section, have walls whose planes intersect at about 60°, have rounded valleys, and flattened peaks between adjacent valleys.

16. A platen according to claim 15 wherein said rounded valleys have a radius of about 0.02 inches.

* * * * *